(12) United States Patent
Gottfriedsen et al.

(10) Patent No.: US 11,808,618 B2
(45) Date of Patent: Nov. 7, 2023

(54) MONOLITHIC WEIGHING BLOCK

(71) Applicant: Wipotec GmbH, Kaiserslautern (DE)

(72) Inventors: Jan Gottfriedsen, Waldfischbach-Burgalben (DE); Thorsten Asal, Kaiserslautern (DE); Tobias Stellwagen, Kaiserslautern (DE); Jan-David Klingelhöfer, Kaiserslautern (DE)

(73) Assignee: Wipotec GmbH, Kaiserslautern (DE)

( * ) Notice: Subject to any disclaimer, the term of this patent is extended or adjusted under 35 U.S.C. 154(b) by 541 days.

(21) Appl. No.: 16/875,235

(22) Filed: May 15, 2020

(65) Prior Publication Data

US 2020/0408590 A1    Dec. 31, 2020

(30) Foreign Application Priority Data

May 16, 2019 (DE) .......................... 102019113001.8

(51) Int. Cl.
| | | |
|---|---|---|
| *G01G 21/24* | (2006.01) | |
| *B33Y 80/00* | (2015.01) | |
| *G01G 7/02* | (2006.01) | |
| *B33Y 10/00* | (2015.01) | |

(52) U.S. Cl.
CPC .............. *G01G 21/24* (2013.01); *B33Y 10/00* (2014.12); *B33Y 80/00* (2014.12); *G01G 7/02* (2013.01)

(58) Field of Classification Search
CPC .................................. G01G 7/02; G01G 21/24
See application file for complete search history.

(56) References Cited

U.S. PATENT DOCUMENTS

| | | | |
|---|---|---|---|
| 4,836,036 A | 6/1989 | Jetter | |
| 6,365,847 B1* | 4/2002 | Muller | G01G 7/02 177/210 EM |
| 6,367,338 B1* | 4/2002 | Hess | G01G 21/244 73/862.381 |
| 10,375,765 B2 | 8/2019 | Chaffins et al. | |
| 10,378,976 B2 | 8/2019 | Clarke | |
| 2006/0096790 A1 | 5/2006 | Muehlich et al. | |
| 2008/0029315 A1* | 2/2008 | Kuhlmann | G01G 21/244 177/225 |
| 2009/0065265 A1* | 3/2009 | Hauck | G01G 21/244 74/519 |
| 2011/0278077 A1* | 11/2011 | Erben | G01G 7/02 177/211 |
| 2013/0168163 A1 | 7/2013 | Gottfriedsen et al. | |
| 2014/0332288 A1 | 11/2014 | Hyer et al. | |

(Continued)

FOREIGN PATENT DOCUMENTS

| | | |
|---|---|---|
| CN | 102077064 A | 5/2011 |
| CN | 107244070 A | 10/2017 |

(Continued)

OTHER PUBLICATIONS

Extended European Search Report in EP 20 17 4901.7, dated Mar. 1, 2021.

(Continued)

*Primary Examiner* — Natalie Huls
(74) *Attorney, Agent, or Firm* — The Culbertson Group, P.C.

(57) ABSTRACT

A monolithic weighing block is produced according to the principle of additive manufacturing, that is, 3D printing.

27 Claims, 12 Drawing Sheets

(56) References Cited

U.S. PATENT DOCUMENTS

| | | | | |
|---|---|---|---|---|
| 2016/0033320 A1* | 2/2016 | Graf | ................ | G01G 7/02 |
| | | | | 177/210 R |
| 2016/0138961 A1* | 5/2016 | Gottfriedsen | ............ | G01G 7/02 |
| | | | | 177/210 EM |
| 2017/0059425 A1* | 3/2017 | Clarke | ................ | G01G 3/1408 |
| 2017/0284857 A1* | 10/2017 | Hauck | ................ | G01G 7/04 |
| 2019/0022929 A1 | 1/2019 | Chaffins et al. | | |
| 2022/0276086 A1* | 9/2022 | Bode | ................ | G01L 1/2243 |
| 2022/0373383 A1* | 11/2022 | Kuhlmann | ............ | B29C 64/30 |

FOREIGN PATENT DOCUMENTS

| | | | |
|---|---|---|---|
| CN | 207798244 U | 8/2018 | |
| DE | 102009017663 A1 | 10/2010 | |
| JP | 2009508117 A | 2/2009 | |
| WO | 2015149123 A1 | 10/2015 | |
| WO | 2017180163 A1 | 10/2017 | |
| WO | 2019121350 A1 | 6/2019 | |

OTHER PUBLICATIONS

Office action dated Mar. 5, 2020 by the German Patent Office in DE 102019113001.8 with English language machine translation.
First China Office Action dated Apr. 26, 2021 in China patent application No. 202010422099.X.
First Japan Office Action dated Apr. 27, 2021 Japan patent application 2020-083914.

* cited by examiner

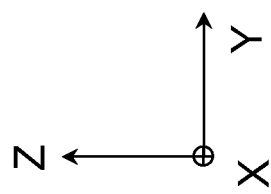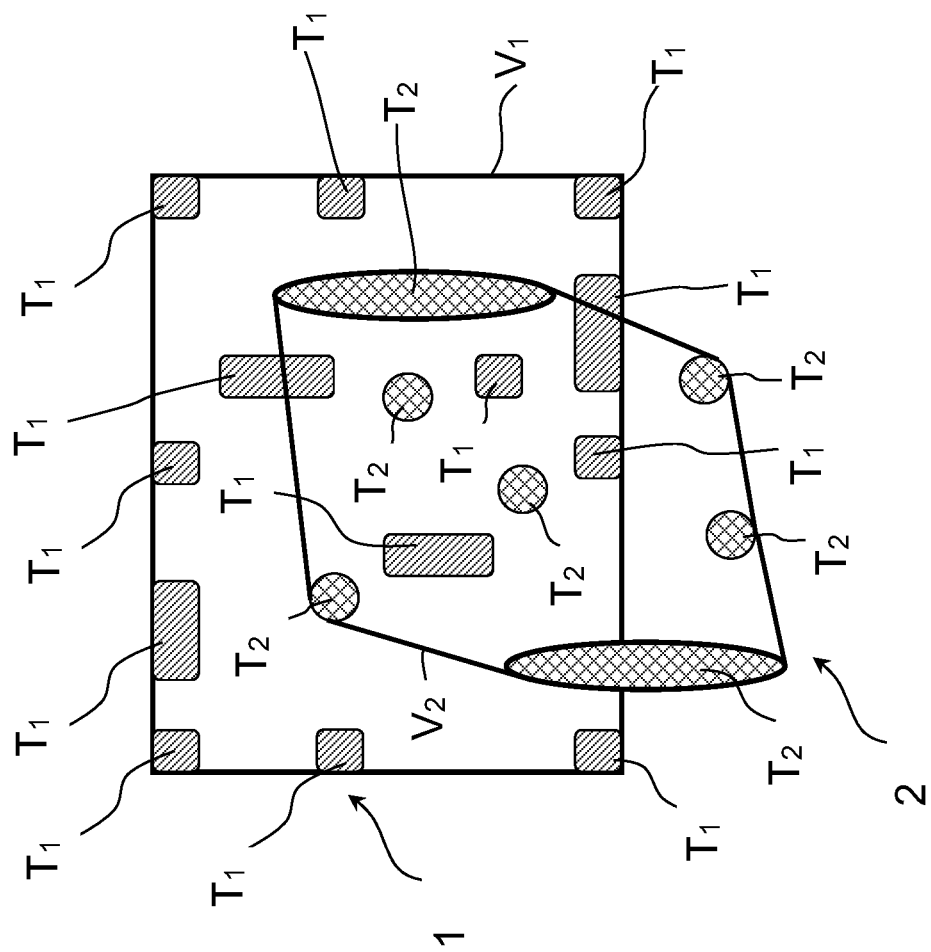
Fig. 10

MONOLITHIC WEIGHING BLOCK

TECHNICAL FIELD OF THE INVENTION

The present invention relates to monolithic weighing blocks and processes for the production thereof.

BACKGROUND OF THE INVENTION

Monolithic weighing blocks ("monoblock") for weigh cells are known from the state of the art. They comprise one or more control arms and further components of a lever mechanism integrally connected thereto, for example parallel control arms, a load receiver and a section referred to as fixed base. "Fixed base" denotes an area of the weighing block which remains substantially fixed in position during operation and serves for the formation of the supporting points or pivot points of levers. A component of the electromagnetic force compensation (usually a permanent magnet), or a position detector, is also carried by the fixed base.

Among other things, the monolithic construction prevents thermal stresses, and dispenses with any manufacturing effort due to the assembly of individual components of the weighing block. However, the machining of such a weighing block is not possible in any desired manner since individual components can lie one behind the other in a first direction and must be separated from each other by corresponding cuts perpendicular to this direction (undercuts). The removal of material from the monoblock can therefore be effected only where, or only from such a direction in which, another component does not impede the access for the tool. Moreover, the material which is not removed but is functionally superfluous gives the monoblock unnecessary weight, and the production of undercuts is complex.

In the state of the art, the manufacture of the monoblock structure is limited to the machining of a three-dimensional body, from which material is removed in a targeted manner, for instance by milling, electrical discharge machining or drilling. The remaining areas of material form individual elements of the monoblock that are connected to each other. Since it is not possible to remove material at any desired positions within the monoblock, the design scope for forming the individual elements, in particular for achieving the necessary stiffness with as little weight as possible, is also limited.

SUMMARY OF THE INVENTION

An object of the invention is to provide a monoblock and a process for the production thereof, with which the above-noted disadvantages and others may be overcome.

Embodiments of the present invention include monoblocks, that is, monolithic weighing blocks, with particularly low weight produced according to the principle of additive manufacturing, also known as 3D printing. Here, in one direction, for example a longitudinal direction X, thin material layers are placed one on top of the other in succession and connected to each other, in order thus to form a spatial body incrementally. Unlike in the state of the art known to date, in which monoblocks are produced by removing material from a solid material, here the monoblock with its components is built up layer by layer by adding material. In tests, the applicant was able to establish, surprisingly, that the high requirements of dimensional accuracy in the production of monoblocks, which lies in the micrometer-range, can also be achieved in the case of monoblocks produced by 3D printing. Precisely for the formation of thin points or pivots, which in conventional monoblocks are often produced by parallel bores lying close together, it was possible to refute the preconception of low manufacturing accuracy in 3D printing. The utilization of 3D printing in the specific application for monoblocks provides several significant advantages:

In the case of the known monoblocks, functionally superfluous material can be removed only to a limited extent since particular components of the weighing block make access difficult or impossible for tools. Accordingly, the weighing blocks are heavier than necessary. Moreover, thicker areas of material heat up more slowly or cool down more slowly than thinner areas of material when the ambient temperature changes, with the result that time passes unnecessarily until steady operating conditions are reached. A monoblock produced according to the invention has material only where it is functionally necessary, with the result that the overall weight is reduced to a minimum. The formation of the individual components of the monoblock as a framework structure, or in any case with individual cross sections that are as small as possible, also reduces the sensitivity in the case of temperature changes.

Until now it was necessary to machine the raw block with tools (in particular milling tools) from different sides, in order to be able to remove material and in particular to be able to mill the individual components within the weighing block out of the solid. This laborious machining can be dispensed with according to the invention.

More complex weighing blocks (for example with more than one lever) often cannot be produced without undercuts in the block. For this, material in the interior of the block must be removed in a first direction and then in a second direction perpendicular thereto. In order to be able to reach the machining position with the tool, in both cases machining openings in other components of the weighing block, in particular the parallel control arms, are often required, which weaken their strength. In contrast, in 3D printing, the undercuts can be formed by zones in which no material layer is built up. Here, it is not necessary to supply a tool to remove material.

Because of the high manufacturing precision, the individual components of the monoblock can be formed lying very close to each other using 3D printing, with the result that the interspaces can turn out to be smaller than could actually be produced using conventional tools. Although electrical discharge machining is also known for the production of thin cuts in monoblocks, for this the cuts must be guided through the whole block, however, which considerably restricts the design freedom.

The individual components of the weighing block can be produced such that they penetrate each other or together fully utilize a part of the weighing block volume. That is possible in particular through the formation of the components with openings or as framework structures, wherein sections of one framework structure can be created inside sections of the other framework structure. This technique, in which a large number of undercuts is formed, is not known for monoblocks in the state of the art.

Weighing blocks according to the invention extends in a longitudinal direction X, a transverse direction Y orthogonal thereto and a vertical direction Z again orthogonal to these two directions. At a first block end, the weighing block comprises a fixed base section which is provided, in particular, for bracing control arms or levers. Parts of a force compensation system can also be mounted on the fixed base. Moreover, the weighing block has two control arms, which extend in the longitudinal direction X and are connected to the fixed base via a supporting pivot, in each case with their first end. At their second end, lying opposite the first end, the two control arms engage on a common load receiver, which is guided parallel relative to the fixed base in the vertical direction Z by means of the control arms. The load receiver serves to receive a weight force introduced in the vertical direction Z. Such a system, which in its simplest form manages without force-transmitting levers, is referred to as a direct load-bearing system, wherein the movement of the load receiver caused by a weight force is compensated by a counteracting force, which is generated via a force compensation system. For example, a coil as part of this force compensation system can then be arranged directly on the load receiver.

3D printing already allows the components of such a system without levers to be formed with as little weight as possible. Moreover, the fixed base, which must be formed as far as the region of the coil on the load receiver for receiving the magnet belonging to the force compensation system, could penetrate the control arms, for example. Fixed base and control arms can thus be formed lying partly one within the other, wherein individual members, struts or other material areas of the control arm only need to have a minimum spacing from those of the fixed base.

Some embodiments of a weighing block according to the present invention comprise at least one first lever, which extends (preferably in the longitudinal direction X) between a first end region and a second end region (this direction of extension, along which the lever forms lever arms for varying forces, can also be referred to as main direction of extension). At the first end region, the lever is connected to the load receiver via a coupling element, in order to guarantee the transmission of a force from the load receiver into the lever. The coupling element comprises at least one load pivot, with the result that a section of the coupling element is pivotable relative to the lever or to the load receiver about a pivot axis formed by the load pivot. Likewise at the first end region, the first lever is additionally connected to the fixed base via a supporting pivot, wherein the supporting pivot also forms a pivot axis. The design with at least one lever can be produced particularly well using 3D printing since here the above-named advantages have their full effect.

In the following, the term "supporting pivot" refers to pivots which connect a movable part of the monoblock, in particular a lever or a control arm, to the fixed base, or brace one thereon. Those pivots via which the control arms are connected to the load receiver are to be referred to as "control arm pivot". Two movable sections of the weighing block are connected to each other via a "load pivot". In particular, the load receiver is connected to an end of a lever via one or more load pivots, and the connection of levers to each other is also effected via load pivots. As a rule, a load pivot is part of a coupling element. All of these pivots in each case form a pivot axis, about which the two sections connected to each other via the pivot are pivotable relative to each other.

Some embodiments of the invention provide that a load pivot is formed as a flexural pivot. As used in this disclosure and the accompanying claims a "flexural pivot" comprises a pivot which provides an articulating connection between two structures where the connection is made up of at least two material bars in which, when viewed along a pivot axis of the flexural pivot, one of the material bars forms an angle ($\alpha \neq 0°$) with at least one other material bar. Here, the at least two material bars preferably do not touch each other in the region of the pivot axis although the material bars extend crosswise to each other to form the angle $\alpha \neq 0°$). Unlike in the case of so-called thin-point pivots, the pivot axis of a flexural pivot is created by the at least two material bars lying one behind the other in the axial direction (that is, along the pivot axis) and crossing each other. Preferably, the crossing angle lies in the range $45° < \alpha < 135°$, most preferably is precisely 90°.

Because of the material bars lying one behind the other in the axial direction, flexural pivots cannot be produced without undercuts in the direction of their pivot axis. At the same time, the crossed material bars have a horizontal and vertical extension transverse to the pivot axis; the pivot therefore occupies a certain space transverse to the pivot axis. A load pivot, via which a force is introduced into the lever at a lever end region, is expediently arranged very close to a supporting pivot bracing the lever in the longitudinal direction of the lever, in order thereby to be able to achieve a short lever arm and a sufficiently high leverage, and the pivot axes of both pivots run parallel. However, the formation of the load pivot as a flexural pivot stands in the way of the formation of the closely adjacent supporting pivot as long as both pivots are produced in a conventional manner, namely by removing material from a monolithic block. There, pivots are namely usually formed through bores in the direction of the pivot axis, the diameters of which determine the minimum spacing from an adjacent further pivot. A flexural pivot created in this way could only be formed at a relatively short axial distance from a further pivot if the two pivots lay one behind the other offset relative to each other in the axial direction. Then, however, the bores of one pivot penetrate the installation space of the other pivot, which could only be prevented by complex undercuts. In contrast, the additive construction of a weighing block according to the invention allows the formation of supporting pivot and load pivot at a short distance from each other, while at the same time the advantages of the flexural pivot can be exploited for the load pivot. This has a particularly advantageous effect if the supporting pivot of the lever provided at the same lever end region as the load pivot is also formed as a flexural pivot of the above-mentioned type. In this case the two pivots lie one behind the other, viewed along their pivot axes (running parallel to each other), and their extension transverse to the respective pivot axis is then greater than the spacing of the pivot axes defining the length of the lever arm. Using conventional manufacturing processes, such an arrangement is at least economically, and probably also technically, unfeasible due to the undercuts and the material-free regions around the pivots required for the machining. In 3D printing, on the other hand, the pivots can be formed and positioned in the manner mentioned without complicated machining processes being necessary for this purpose.

According to some embodiments of the invention, a coupling element, which serves for transferring force between two levers or a lever and the load receiver, comprises at least one, preferably two flexural pivots of the above-mentioned type, which are spaced apart from each other by a material web transmitting the lever force. Depending on the extension of the respective pivots transverse to their pivot axis, the pivots can be arranged offset one behind the other or laterally next to each other/one above the other, viewed along their parallel pivot axes. 3D printing also enables the arrangement of one or two flexural pivots (with their associated undercuts) at a short distance from each other on one coupling element, wherein, independently thereof, the formation of a coupling element with at least one flexural pivot also brings the advantage of defining a pivot axis other than via a thin point and of providing this particular construction directly on a load pivot. (This design according to the invention of a coupling element is not necessarily coupled to a weighing block according to the invention and also provides the named advantages independently thereof).

Embodiments of the invention may provide that the pivot axes of the supporting pivots or control arm pivots arranged on the control arms lie at the corners of a parallelogram. The control arms then lie one above the other in the Z direction in the form of an upper and a lower control arm and extend orthogonally thereto in the longitudinal direction X between the load receiver and the fixed base (other spatial arrangements are also conceivable). This arrangement makes it possible in an advantageous manner to extend the fixed base between the control arms, in order thus to be able to form further supporting points.

Still further embodiments of the invention provide that at least one load pivot or supporting pivot connected to a lever is bordered, seen in the direction of its pivot axis, on one, preferably on both sides by a material section of this lever. The lever then also extends to the side of the pivot (seen, for example, in the transverse direction Y) and there can have a Z dimension sufficient for its desired stiffness. This arrangement of a pivot to the side of the lever connected to the pivot provides design advantages. The two elements of the weighing block to be connected to each other by the pivot can be arranged at least partly or also completely one behind the other in the direction of the pivot axis, with the result that, in this region, the overall installation height of the two elements with the intermediate pivot turns out to be smaller than the sum of the installation heights of the individual elements and the pivot. A lever to be pivoted about a Y axis, for example, can be braced, via a supporting pivot, on the fixed base, which is located substantially in front of or behind this lever in the Y direction. In the state of the art, the lever always runs past the pivot axis spaced apart in the X or Z direction since, for the design according to the invention, (preferably narrow) undercuts would be required, which are virtually impossible to produce in machining production.

Weighing blocks in accordance with the invention may provide that at least two pivots engaging on the same lever lie one behind the other in the direction of their pivot axes spaced apart from each other such that the pivot cross sections formed perpendicular to their pivot axes overlap in a projection in the direction of the pivot axes. The advantage already described previously for the load pivot with adjacent supporting pivot when a flexural pivot is used can also be transferred to other pivot forms, which have a certain lateral extension transverse to their pivot axis, in the case of 3D printing according to the invention. It thereby becomes possible to choose the pivot axis spacing, existing in a direction (X, Y, Z), of two pivots connected to the same lever, the pivot axes of which do not align, to be smaller than the extension of at least one of the pivots in this direction, with the result that the articulated connection of levers is possible in a tight space. Typically, combinations of pivots of different types, thus for instance a supporting pivot with a load pivot, or a load pivot with a control arm pivot, are involved here. Then, as a rule, it is the case that the respective pivot axes are spaced apart from each other, thus do not align.

The fact that, according to the invention, the pivot axis of a pivot can also extend through the element guided by this pivot, enables a further advantageous embodiment, according to which at least one lever has a slot for receiving a pivot connected to this lever. The slot thus borders the pivot at least on one side and protects it from undesired impact or dirt. The arrangement of a slot formed by a lever with a pivot lying therein and pivotably connecting the lever is almost impossible to produce in a monolithic design using conventional machining processes.

In addition to the space-saving arrangement of the pivot relative to the lever (the pivot axis can again pass through the lever), the elements of the slot can perform several functions. Here, the slot comprises at least one wall section, from which a first supporting section projects on one side for connection to the pivot, for example in that two crossed bars of a flexural pivot engage on there. A further supporting section can project on the other side of the wall section in order to connect elements of a further pivot. For example, the case where, seen in the transverse direction Y, a supporting pivot which braces the lever on the fixed base is formed on one side of a slot wall of a lever is conceivable. The slot wall then extends along an X-Z plane, for instance. The supporting pivot engages on the lever side (for example from below) on the supporting section, which projects laterally in the transverse direction Y from an upper region of the slot wall. The pivot extends substantially laterally next to or along the slot wall and its pivot axis runs in the transverse direction Y.

In these slot arrangements, on the other side of the slot wall, diametrically opposite the first supporting section, a further supporting section may project in the transverse direction Y (opposite the supporting section on the other side) from a lower region of the wall and is to form the lower contact point of a coupling element. For this purpose, the coupling element has a load pivot to be connected to the further supporting section, which, starting from this supporting section, extends upwards along the slot wall on this side, and the pivot axis of which again runs in the transverse direction Y. In each case one pivot, which engages in each case on a supporting section projecting on different sides of the slot wall, is then arranged on both sides of the slot wall. The two supporting sections thus form an approximately "Z"-shaped cross section with the slot wall, with sections of the Z shape running orthogonal to each other.

In this way, the pivot axes of the two pivots can lie very close together in order to produce a very large leverage, and at the same time the lever can form a high bending stiffness against bending moments about the Y axis, for example due to the height of the slot wall. Seen in the Y direction, the two pivots lie in front of and behind the slot wall, preferably at a short Y distance from the slot wall, and the respective lateral extension of each pivot transverse to its pivot axis cannot restrict the formation of the respectively other pivot, unlike with the known machining processes in the state of the art.

According to further advantageous embodiments of the invention, at least one further lever is provided which has substantially the same purpose as the first lever, in order, by connecting the two levers one behind the other, to achieve an even higher transmission ratio for the weight force introduced via the load receiver than is possible with only one lever. More than two levers can also be connected one behind the other for this purpose, wherein a lever braced centrally can also transmit the force in an unchanged amount.

The further lever extends between a first end region and a second end region, wherein the direction of extension can correspond to the longitudinal direction X or the direction of extension of the first lever. However, the formation according to the invention of the monoblock using 3D printing enables the directions of extension of several levers coupled to each other to be chosen to be different. Thus, a first lever could extend in the longitudinal direction X, whereas a further lever coupled to it extends obliquely or orthogonally thereto, for example in the transverse direction Y or the vertical direction Z. The coupling elements connecting the levers to each other then have two pivots, the pivot axes of which no longer run parallel. Several levers connected one behind the other can therefore extend in any desired manner in space, just like the pivot axes of the pivots connected to them, with the result that the pivot axes of two pivots, in particular of two supporting pivots, no longer run parallel to each other, but rather (theoretically displaced as far as the cut) enclose an angle ($\beta \neq 0$) (in contrast, in the case of the previously known production processes for monolithic weighing blocks it was usual, for machining reasons, to form the pivot axes of all levers parallel to each other since pivot axes running transverse to each other, in particular in the case of several levers coupled together, are technically and economically impossible to produce). The non-parallel pivot axes according to these embodiments makes it possible to achieve high transmission ratios along different spatial directions, with the result that, depending on requirements, the extension of the weighing block in the X, Y or Z direction can be optimally reduced.

At its first end region, the further lever is connected to the second end region of the first lever via a coupling element having a load pivot, and in addition to the fixed base via a supporting pivot. At its second end region, the further lever can either be coupled to another further lever or carry a component of the force compensation system, then it is said to be the "last" lever.

If the second lever extends substantially in the same direction as the first lever coupled to it, 3D printing provides advantageous possibilities for arranging or forming the levers in a space-saving manner. For example, one of the two levers could have an opening, into or through which a section of the respectively other lever protrudes. The levers can penetrate each other partly or completely, and thus make a space-saving design possible. For example, the first lever could have an opening, extending in the longitudinal direction X and open at the top and/or at the bottom in the vertical direction Z, which borders the lever on both sides in the transverse direction Y. A section of the second lever or another component of the weighing block can extend through this opening. In this way, both levers can form a large area moment of inertia and thus a high degree of stiffness in relation to bending about the Y direction, for which purpose a certain extension in the vertical direction Z is required. At the same time, the levers can lie partly one behind the other or one in the other in the transverse direction Y. Conventional monoblocks with such levers are difficult or impossible to produce since the separation of the levers in the transverse direction Y is only possible using a tool advanced in the vertical direction Z. However, if the levers lie between the parallel control arms in the vertical direction Z, or if individual sections of one lever impede the advancement of the tool to the other lever, as a rule this machining is possible only through additionally required openings in the control arms or levers, as a result of which their stiffness is weakened.

Some embodiments of the invention provide that the monoblock comprises at least two levers, which penetrate each other such that they pass through a volume section of the monoblock together. The particular advantage of 3D printing in connection with monolithic weighing block here lies in the fact that the levers of a monoblock, in particular in connection with the electromagnetic force compensation, only perform a virtual movement, since each lever deflection is immediately corrected again by the force compensation system, therefore the levers do not actually move relative to each other but have the freedom of movement to do so. Since the levers do not perform an actual pivoting movement and accordingly do not require any space for one, they can be formed lying one in the other in such a way that a first lever is largely or completely closely adjacent to a second lever or enclosed by it. For example, a first lever which is formed as a framework structure around an elongate internal space running in the direction of extension of the lever would be conceivable. The second lever is partly or completely arranged in the internal space of the first lever.

Here, individual sections or members of the first lever can also lead through the internal space, in order for this lever to be formed stable. It must merely be ensured that the second lever does not collide with the first lever with its sections or members. Since the levers do not perform an actual pivoting movement, the individual sections of the two levers can be formed lying very close to each other, for example with spacings below 1000 or 500 μm. Here, the individual sections or members of each lever can extend in all spatial directions or obliquely thereto or also in a bent form, in order to achieve the necessary lever stiffness. At the same time, the levers can penetrate each other inseparably, in that sections of one lever linked together, which form a closed material chain, lead through a corresponding material chain of the other lever.

Instead of a formation as framework structure, the components of the weighing block can also exhibit a lattice structure with walls as thin as possible, formed of regular polygons, for example prisms, which penetrate the component along one or more directions. Material-free regions can have the shape of regular geometric bodies (cuboids, pyramids, spheres, prisms, etc.).

Expediently, in a section transverse to a direction X, Y, Z, in particular with respect to the longitudinal direction X, at least two components of the weighing block in each case form a cross section with a cross-sectional area consisting of several separate partial areas, wherein the envelopes of the two cross sections at least partially overlap, and wherein in each case at least one partial area of one cross section lies inside the envelope of the other cross section. In particular, the following come into question as components here: fixed base, load receiver, lever, coupling element, control arm or pivot. By "envelope" is meant in this disclosure and the following claims that lateral boundary of a cross section which connects the points of the cross section lying furthest out in each case to each other in the manner of an elastic band placed around the cross section. From this it becomes clear that material sections of one component can extend through material sections of the other component and, at the same time, be framed by the latter at the sides. The space-saving arrangement of the components in each other is thus possible particularly well.

The interpenetration need not be effected such that one lever is arranged completely inside the other lever. A partial penetration is also possible in such a way that the volume circumscribed by one lever protrudes partly into the volume circumscribed by the other lever. This reduces the volume necessary for the formation of the weighing block and in particular the weight thereof.

According to further advantageous embodiments of the invention it is provided that, starting from a first block end, the fixed base extends in the longitudinal direction X between the parallel control arms and/or through the load receiver. In particular, the extension through the load receiver provides the advantage of also being able to brace components of the force compensation system on the other side of the load receiver, for instance a permanent magnet or elements of a position detector. The fixed base pushed up into the region of the load receiver also makes it possible to form supporting points for levers inside the space circumscribed by the load receiver. The levers can thereby be designed as long as possible from the load receiver to the first block end and are not restricted to the space available between these two components. For example, it is conceivable to form a supporting pivot for a first lever, into which a force is to be introduced from the load receiver, partly or completely inside an opening in the load receiver. The fixed base can also have a comparable opening, with the result that end regions of levers can extend into the fixed base in order here too to be able to achieve as long a lever length as possible. In this case, "opening" is to mean a material-free region running along a direction X, Y or Z, which, in a projection along this direction, is surrounded on all sides by the material of the respective component. (This guiding according to the invention of the fixed base through the load receiver is not necessarily coupled to a weighing block according to the invention and also provides the named, preferably also separately protectable, advantages independently thereof).

Furthermore, it is conceivable to form the load receiver in a region between the upper and lower parallel control arms, with the result that they overlap the load receiver in the vertical direction Z. The control arms can then be formed in a maximum length and the load receiver lies substantially inside the corners of the parallelogram which is formed by the pivot axes of the control arm pivots, seen in the transverse direction Y. (This design of the load receiver is not necessarily coupled to a weighing block according to the invention and also provides the named, preferably also separately protectable, advantages independently thereof).

The additive construction according to the invention of the weighing block also enables a lever to be bordered on both sides, for example in the transverse direction Y, by a further lever, which itself is bordered on both sides in the same direction by the fixed base. The levers therefore lie, bordered laterally, between sections of the fixed base and are at the same time particularly well protected in the case of a reduced installation height of the weighing block.

The previously described flexural pivot can also include at least three material bars. The at least three material bars together connect a first section to a second section in an articulated manner, wherein, in a projection along the pivot axis, at least one of the material bars forms an angle ($\alpha$) with at least two other material bars. Here, at least three material bars are thus formed, wherein the middle bar is preferably inclined by the angle ($\alpha$) in relation to the other two identically directed bars. Preferably, the angle again obeys the condition $45° < \alpha < 135°$, most preferably it is $90°$. For the formation of such a pivot, several material-free regions or undercuts lying one behind the other in the direction of the pivot axis are required, which are almost impossible to produce using machining processes, in particular if further pivots of the same type are to be provided at a close distance therefrom. The particular stability of a flexural pivot formed with three or more bars can be achieved through the additive construction of the pivot, however. (This design according to the invention of a flexural pivot is not necessarily coupled to a weighing block according to the invention and also provides the named, preferably also separately protectable, advantages independently thereof).

At least one section of a lever or control arm or of a pivot or of the fixed base or of the load receiver or of a coupling element is preferably formed as a framework structure. The whole component is preferably formed as a framework structure, wherein most preferably the entire weighing block has such a structure. The weight of the weighing block can thereby be reduced to a minimum, while the framework design at the same time ensures the required stiffness of the components. The interpenetration described above for two levers can also be realized for any other, functionally identical or different components of the weighing block. The term "framework structure" is used in this disclosure and the accompanying claims to represent designs which are made up of several individual material sections, wherein mainly longitudinal forces but no, or only slight, bending moments occur in the individual material sections.

The 3D printing according to the invention of the weighing block makes possible the formation of the individual components with little material accompanied by high stiffness and in a space-saving arrangement relative to each other. Embodiments according to the invention may therefore be characterized in that the cross-sectional area of at least 50%, preferably more than 80% of all cross sections covered by a lever perpendicular to its direction of main extension is smaller than the area framed by the envelope of the respective cross section. The connection between the totaled area of the individual partial areas forming the cross-sectional area and the area enclosed by the envelope makes it clear that the 3D printing according to the invention makes considerable material savings possible precisely for the complex structures of a monolithic weighing block and at the same time enables the neat arrangement of the individual components in the regions becoming free due to the material saving.

The additive creation of the weighing block is not restricted to the block as a whole. The advantages of 3D printing also found surprisingly for the components of a weighing block thus also apply to each of the components by themselves. A subject-matter of the invention is therefore also a component of a weighing block produced in this way as well as the production of the component as such using 3D printing.

Processes according to the invention for the production of the components of the weighing block or of the weighing block as a whole are based on forming the individual components through the repeated deposition of thin material layers on each other (3D printing). In the process, the block, starting from a first end, such as for example the first block end, is preferably built up incrementally in thin layers, for instance in the longitudinal direction X. Material-free regions within the layers form interspaces or undercuts, which separate the individual components from each other. The production of one component is preferably, but not necessarily, effected "simultaneously" with the production of other components, wherein by "simultaneously" is meant that, first of all, all material regions of a particular layer or at a particular layer height are formed before the next-higher layer is applied. The material buildup of one component is thus interrupted by the material buildup of at least one further component, if both components require material buildup in the same layer height. However, it is theoretically also possible first of all to form one component partly or completely, in order then to create a further component.

Any material which for one thing meets the requirements of highly precise 3D printing and for another meets the requirements of the material behavior usual in the case of monolithic weighing blocks can be used as material for weighing blocks in accordance with the present invention. The monolithic formation of the weighing block does not rule out different materials being used for different regions or components of the weighing block, which can nevertheless be monolithically connected to each other. Thus, for the fixed base which is particularly stressed with respect to stiffness, a different material could be chosen than for the load receiver, the bending stiffness of which may possibly be of lesser importance. Furthermore, it is also conceivable to use electrically conductive material, for instance in order to print a coil arranged on the last lever or connections to position detectors or other sensors.

In an advantageous embodiment, the weighing block is formed partly or completely of metal, preferably aluminum or an aluminum alloy.

Although a weighing block according to the invention is produced at least partially as a 3D print, the invention as set forth in the following claims also encompasses post-processing a 3D printed element with machining tools.

These and other advantages and features of the invention will be apparent from the following description of representative embodiments, considered along with the accompanying drawings.

BRIEF DESCRIPTION OF THE DRAWINGS

FIG. 10 a schematic sectional representation of two levers penetrating each other.

DESCRIPTION OF REPRESENTATIVE EMBODIMENTS

Figure 9:
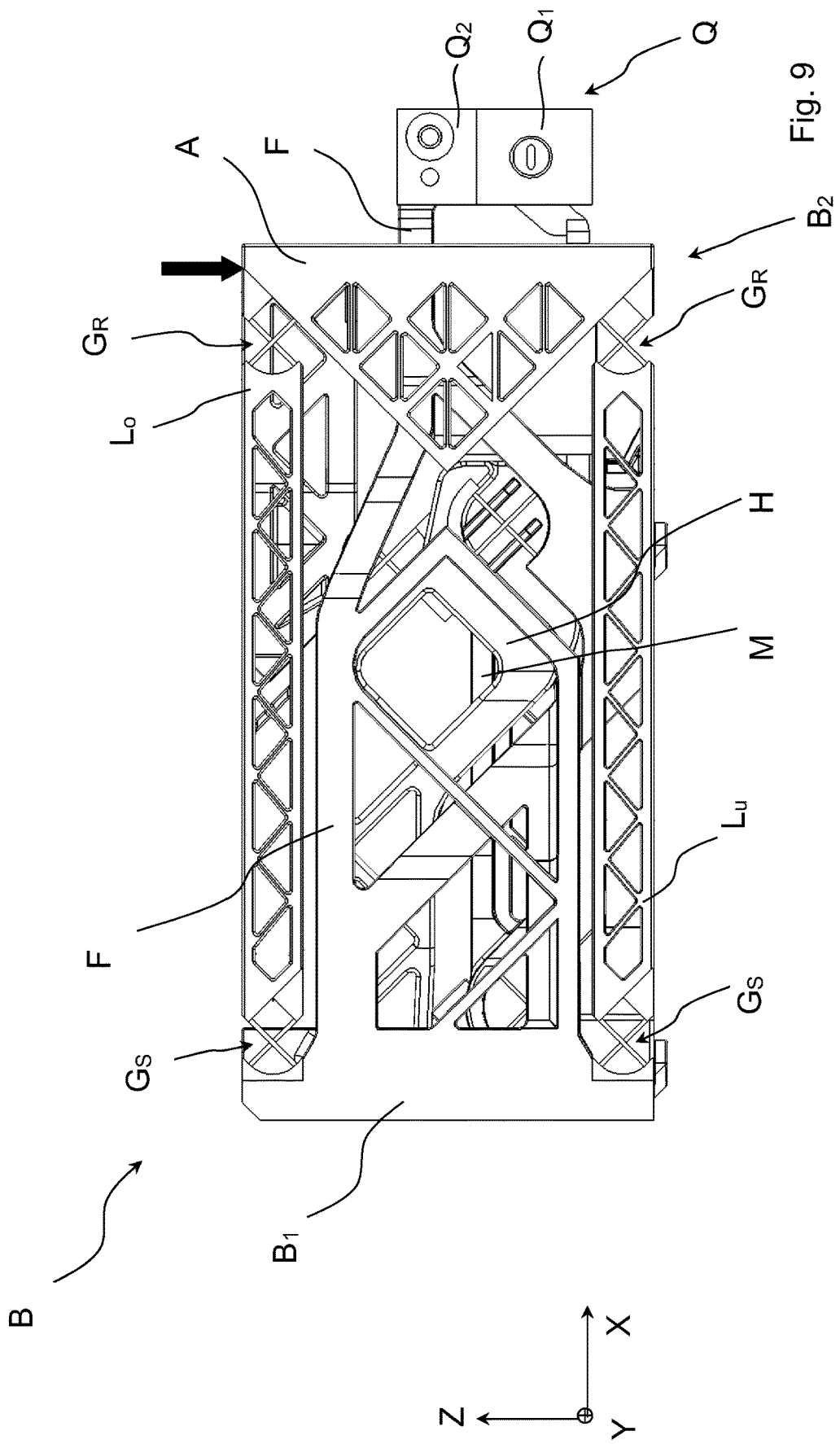
FIG. 9 a side view of a weighing block according to the invention, portions of which are shown in FIGS. 1-8.

FIG. 9 shows a complete weighing block B according to the invention in a schematic side view. The weighing block B extends in a longitudinal direction X, a transverse direction Y orthogonal thereto and directed into the drawing plane and a vertical direction Z again orthogonal to the two directions. A first block end $B_1$ (on the left in FIG. 9) is formed as a fixed base F over the entire Z height. Starting from the first block end $B_1$, the fixed base F extends with a reduced height in the longitudinal direction X towards the right in the direction of the second block end $B_2$. An upper and a lower parallel control arm $L_o$, $L_u$ engage on an upper and a lower section of the first block end $B_1$, in each case via two supporting pivots $G_S$ on the fixed base F lying one behind the other in the transverse direction Y, wherein the pivot axes formed by the control arm pivots run in the transverse direction Y (and are not described in more detail).

The parallel control arms $L_o$, $L_u$ extend in the longitudinal direction X up to a load receiver A, which is provided for receiving a weight force indicated by an arrow. The parallel control arms $L_o$, $L_u$ engage on the load receiver, in each case via two control arm pivots $G_R$ lying one behind the other in the transverse direction Y. The pivot axes formed by the control arm pivots and the supporting pivots lie at the corners of a parallelogram, with the result that the load receiver A is guided parallel relative to the fixed base in the vertical direction Z by the parallel control arms $L_o$, $L_u$.

Not only the protruding section of the fixed base F, but also a first control arm M and a second control arm H coupled thereto extend in the vertical direction Z between the upper and the lower parallel control arms. The second control arm H protrudes through the load receiver A in the longitudinal direction X and, at its free end, cooperates with a first part $Q_1$ of an optical sensor Q, which detects the deflection of the lever relative to a second part $Q_2$ of the optical sensor. The fixed base F also protrudes through an opening in the load receiver A in the longitudinal direction X and carries the second part $Q_2$ of the optical sensor Q.

Figure 1:
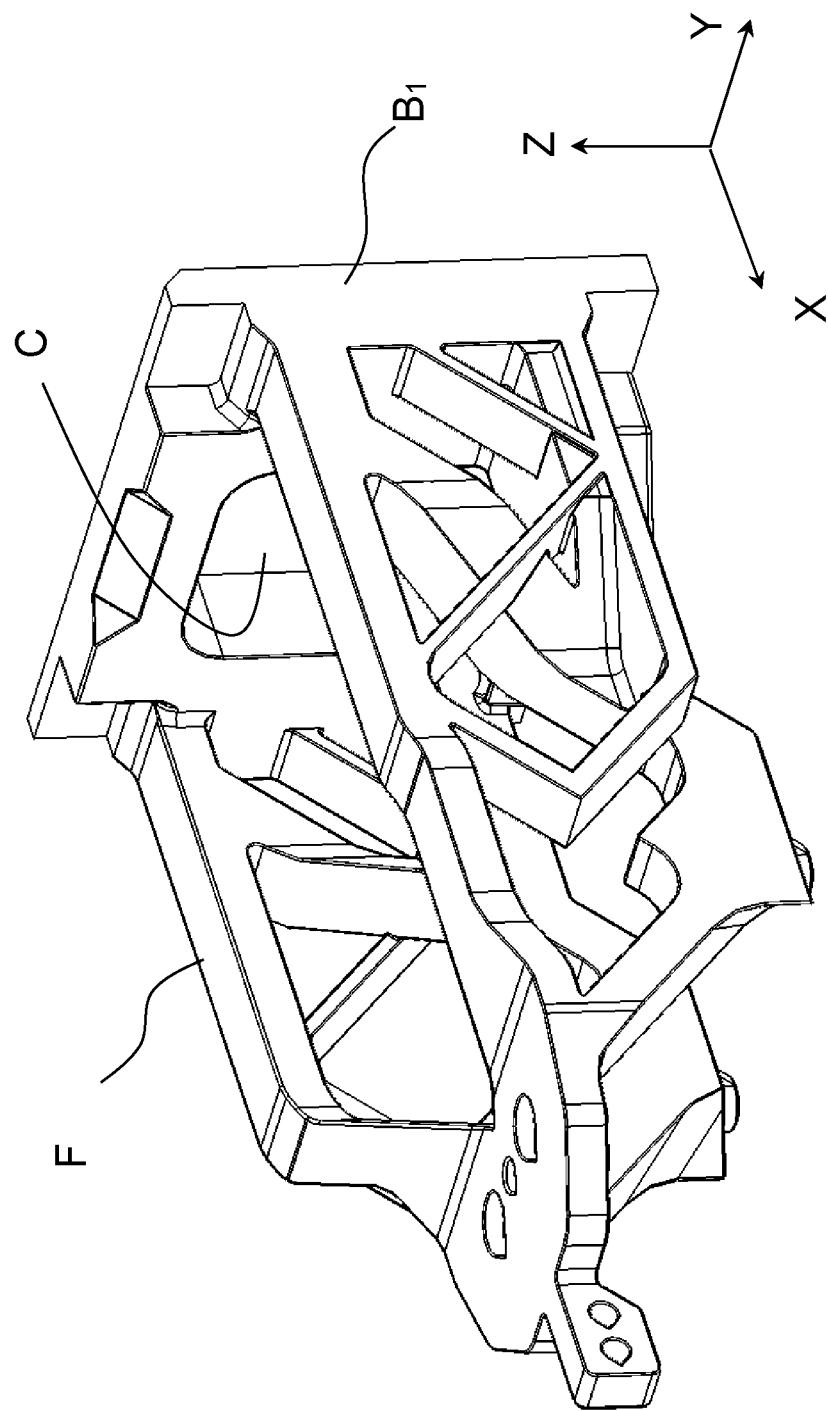
FIG. 1 is an isometric view of the fixed base of a weighing block according to one embodiment of the invention.

FIG. 1 shows the released fixed base F of the weighing block according to FIG. 9. The fixed base F is formed partly with a framework-type structure. An opening C, which is provided for receiving sections of the control arms H and M, is formed in the fixed base F at the first block end $B_1$. The fixed base F has an approximately cuboid outer contour, wherein the internal space is largely kept free.

Figure 2:
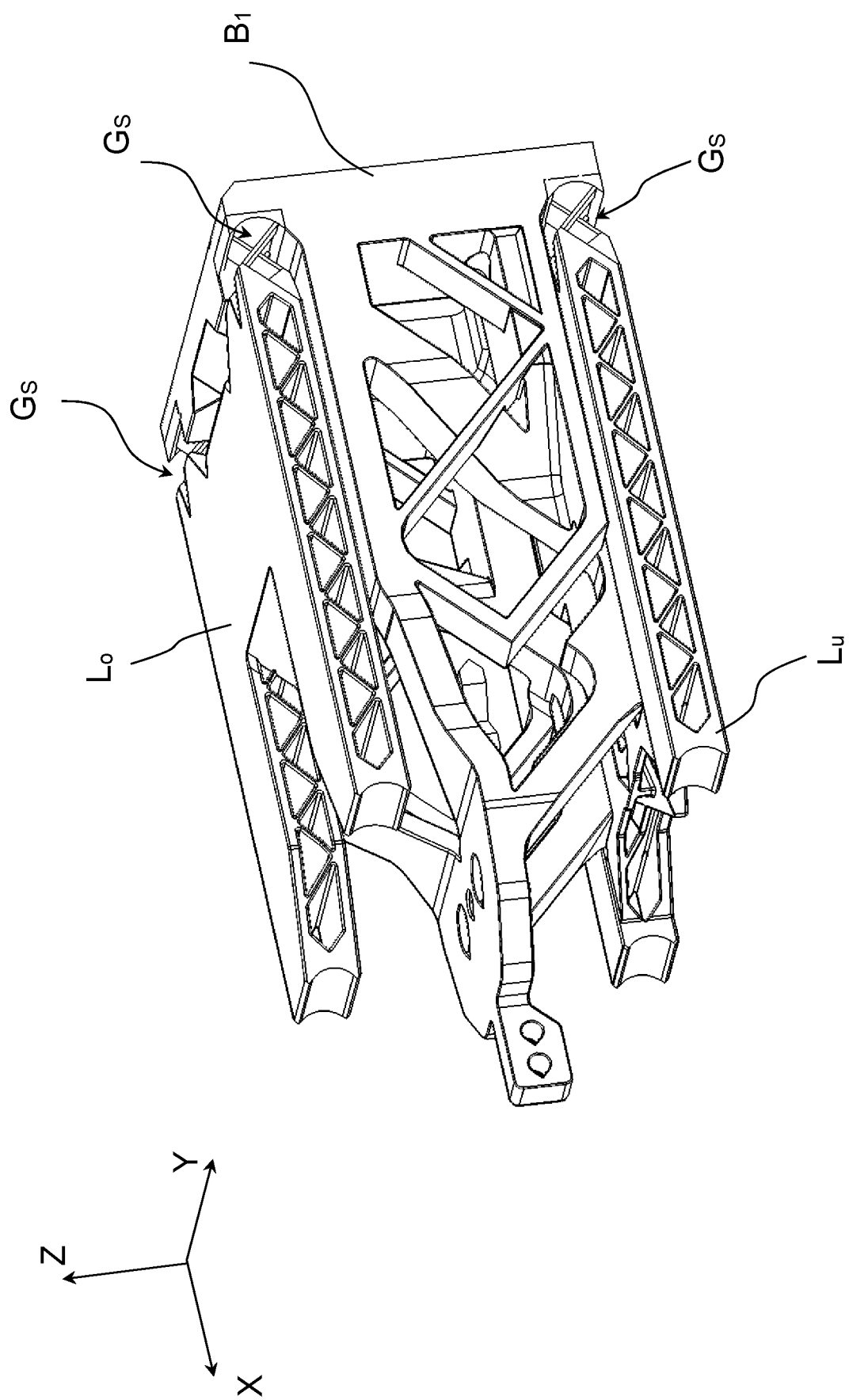
FIG. 2 is an isometric view of the design according to FIG. 1 with parallel control arms.

FIG. 2 shows the fixed base with the parallel control arms $L_o$, $L_u$ arranged thereon. The control arms have a lattice-like structure, which is made up of individual prisms running in the transverse direction Y. The upper side of the upper control arm $L_o$ and the underside of the lower control arm $L_u$ are formed largely closed, wherein both control arms have an opening in the longitudinal direction X on the side facing away from the first block end $B_1$ for receiving sections of the load receiver A. The control arms are connected to the fixed base F in an articulated manner via supporting pivots $G_S$. The supporting pivots are formed as flexural pivots.

Figure 3:
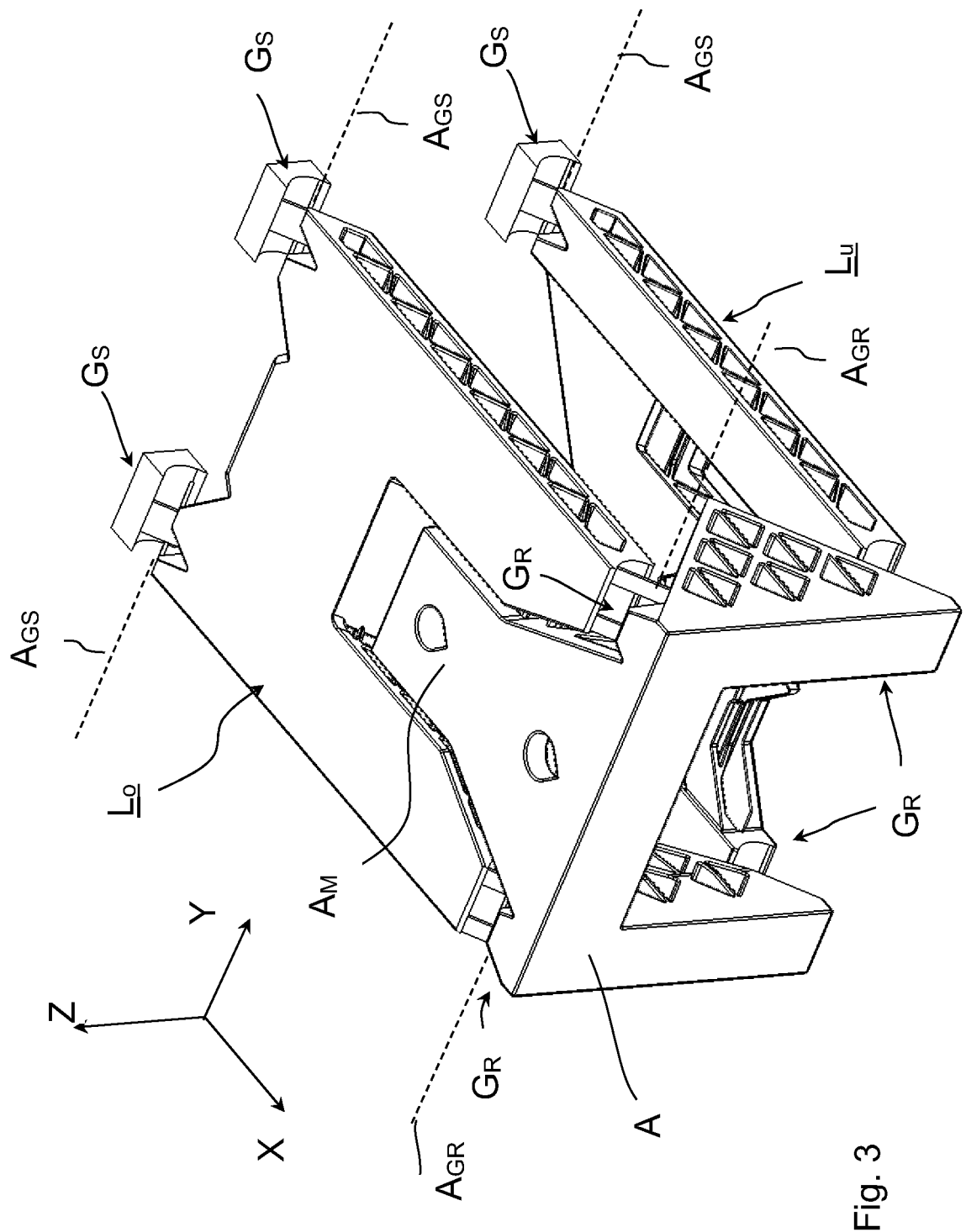
FIG. 3 is an isometric view of the parallel control arms according to FIG. 2 with a load receiver engaging thereon.

FIG. 3 shows the load receiver A in a schematic representation. It is connected to the parallel control arms $L_o$, $L_u$ via control arm pivots $G_R$, wherein, like the control arm pivots, the supporting pivots $G_S$ form pivot axes $A_{GS}$, which, in the embodiment according to FIG. 3, all run parallel to each other in the transverse direction Y and are not fully described. The load receiver A also exhibits sections with a lattice-like structure for saving weight. A central section $A_M$ of the load receiver A protrudes in the longitudinal direction X into the opening of the upper control arm $L_o$.

Figure 4:
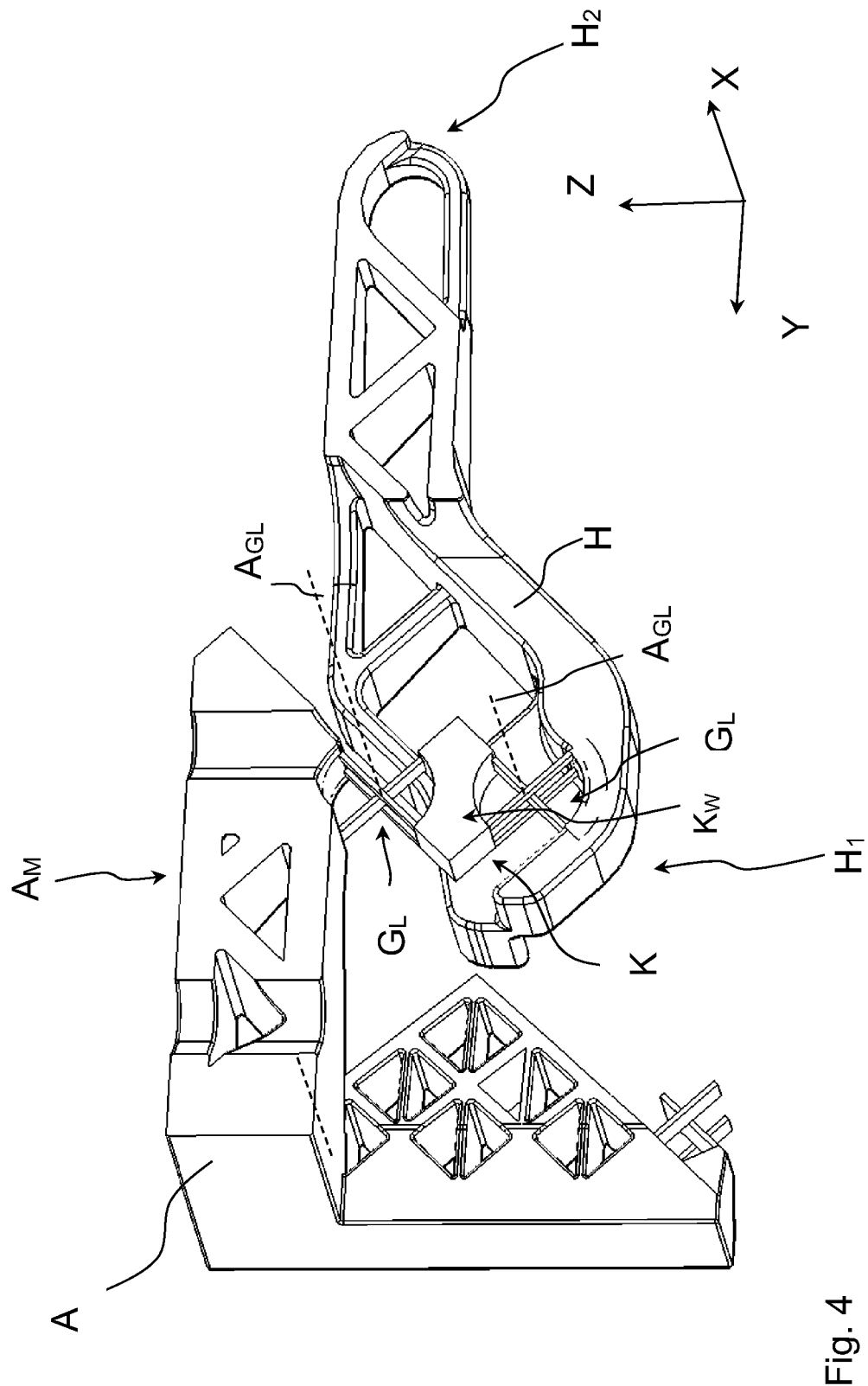
FIG. 4 is a partially cut away isometric view of a part of the load receiver according to FIG. 3 with a first lever engaging thereon.

FIG. 4 shows the partially broken open load receiver A obliquely from below. A first coupling element K engages on the load receiver A in the region of the section $A_M$ of the latter. The coupling element has two load pivots $G_L$ arranged one above the other in the vertical direction Z, which are in each case formed as flexural pivots and in each case have a pivot axis $A_{GL}$ running in the transverse direction Y. The upper load pivot is connected to the section $A_M$ of the load receiver A and serves for receiving and transmitting a load introduced into the load receiver A. A web $K_W$ connecting the two pivots to each other is arranged between the two load pivots of the first coupling element K. The lower load pivot sits in a slot of a first lever H and engages on the lever H at a first end region $H_1$ of it. The lever H extends in the longitudinal direction X up to a second end region $H_2$, in order to be coupled to a second lever M there.

Figure 5:
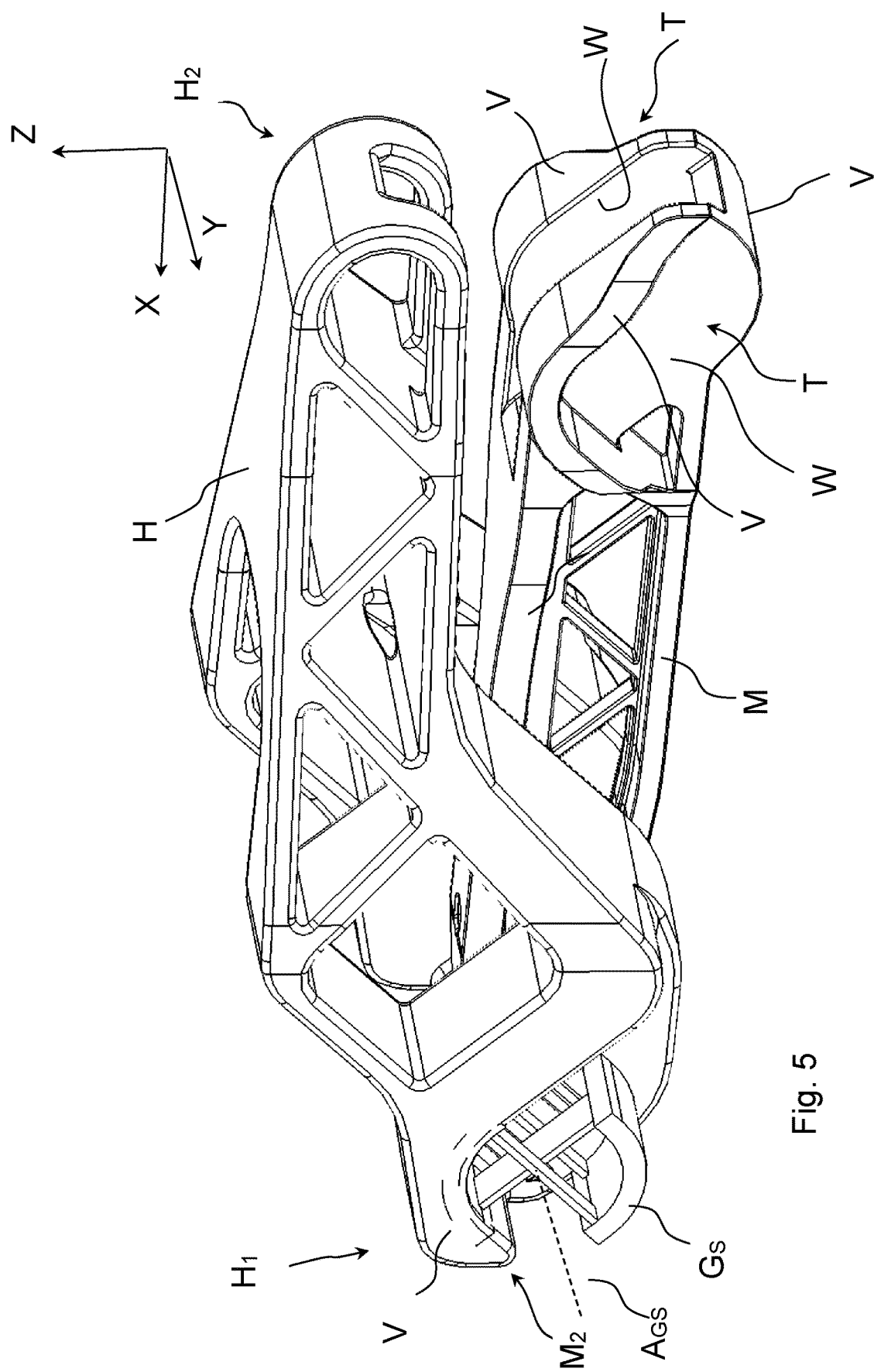
FIG. 5 is an isometric view of the first lever according to FIG. 4 with a second lever lying underneath it.

FIG. 5 shows the arrangement of the first lever H with a second lever M extending through it. The second lever M also extends in the longitudinal direction X from a first end region $M_1$ up to a second end region $M_2$ (see FIG. 6). For bracing on the fixed base (not represented), at its first end region $H_1$ the lever H is provided with two supporting pivots $G_S$ lying one behind the other in the transverse direction Y, which form a common pivot axis $A_{GS}$. The lever H is formed approximately symmetrical with respect to a central X-Z plane, and, in FIG. 5, the rear supporting pivot $G_S$ is hidden by sections of the lever construction. The two supporting pivots $G_S$ are formed as flexural pivots (all flexural pivots shown in FIGS. 1 to 9 comprise in each case three bars lying one behind the other in the direction of the pivot axis, which connect to each other the two sections to be guided in an articulated manner with respect to each other. The middle bar is inclined by 90°, relative to the pivot axis, in relation to the other two bars).

For the space-saving arrangement of the two levers, the first lever H has a clearance running in the longitudinal direction X passing through it, which is occupied by the second lever M. Both levers are at least partly formed as a lattice design.

Figure 6:
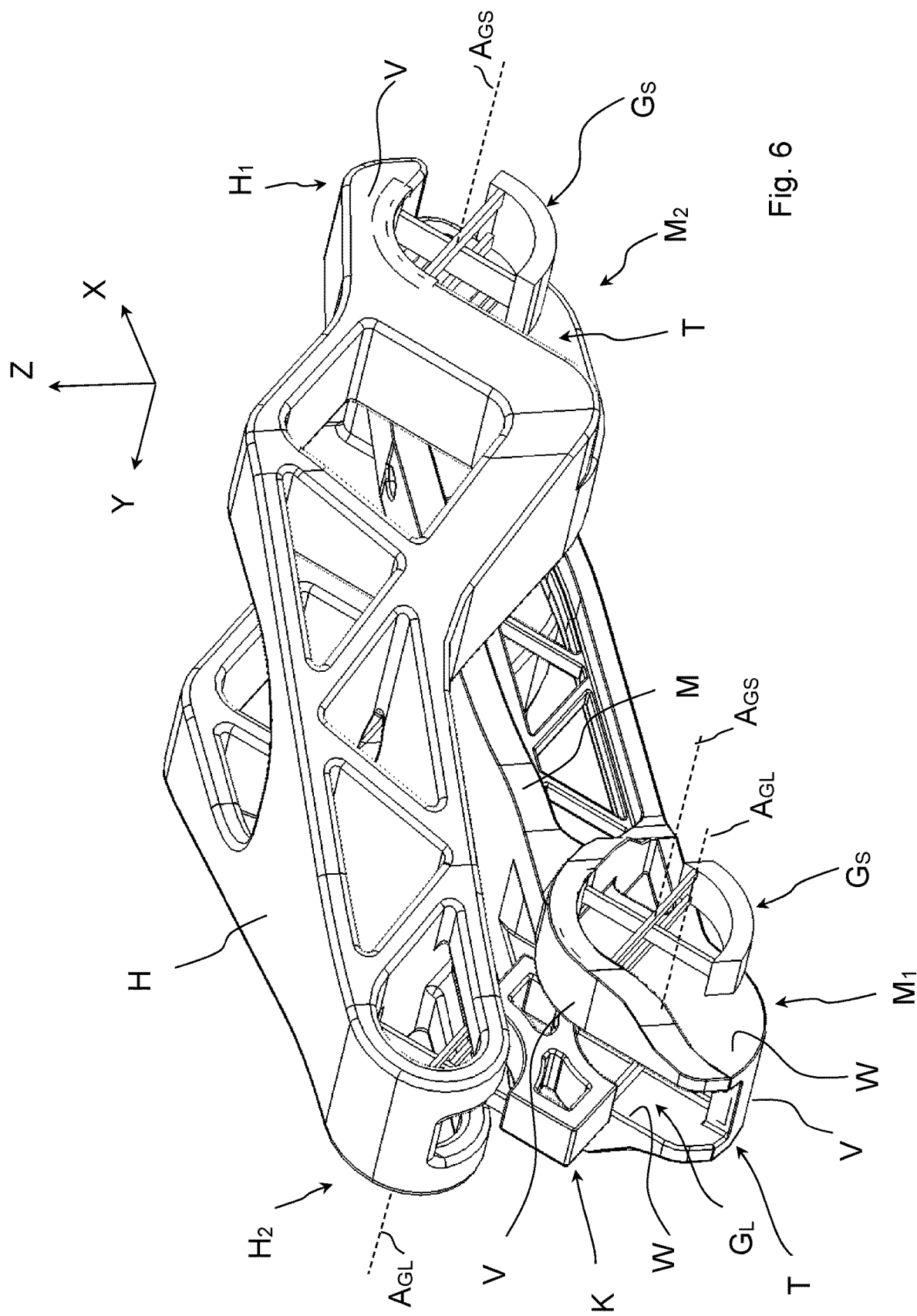
FIG. 6 is an isometric view of the two levers according to FIG. 5, connected by a coupling element.

FIG. 6 shows, from another point of view, how the first lever H is connected, at its second end region $H_2$, to the first end region $M_2$ of the second lever M via a second coupling element K. The second coupling element K again comprises two load pivots $G_L$ (of which only the lower one is labeled) arranged one above the other in the vertical direction Z. Analogously to the design of the first coupling element in FIG. 4, the two load pivots $G_L$ in each case form a pivot axis $A_{GL}$ running in the transverse direction Y. The two load pivots are connected to each other via an intermediate web. Unlike the first coupling element K in FIG. 4, here the web has openings passing through it, in order to save weight.

The lower load pivot $G_L$ is arranged in a slot T of the lever M. In the transverse direction Y, the slot T has two wall sections W parallel to each other, which receive the lower load pivot $G_L$ between them. At their lower end, the two wall sections W are connected to each other by a common supporting section V. The lower load pivot $G_L$ engages on this supporting section V, in order to introduce the lever force transmitted from the first lever H through the coupling element K into the lever M. On the outer side of the two wall sections, facing away from the lower load pivot in each case, a supporting pivot $G_S$ is provided in each case, which braces the lever M on the fixed base, which is not represented (wherein FIG. 6 shows only the front one of the two pivots). To brace the lever M via this supporting pivot, on the outer side of each wall section W, facing away from the lower load pivot $G_L$, an upper supporting section V, under the underside of which bars of the supporting pivot $G_S$ formed as a flexural pivot engage, projects laterally outwards in the transverse direction Y. Each wall section W of the slot T thus has, on sides lying opposite in the transverse direction Y, two supporting sections V arranged offset with respect to each other in the vertical direction Z, with the result that a cross section perpendicular to the longitudinal direction X would result, due to each wall section, in an approximately Z-shaped contour (with sections orthogonal to each other).

The two supporting pivots $G_S$ at the first end region $M_1$ of the lever M define the pivot axis, about which the lever is pivotable relative to the fixed base. The distance between the common pivot axis $A_{GS}$ of the two supporting pivots $G_S$ lying one behind the other in the transverse direction Y and the pivot axis $A_{GL}$ of the lower load pivot $G_L$ defines a short lever arm of the lever M. In order to achieve high transmission ratios, the distance should be chosen to be as small as possible. Although the pivots $G_L$, $G_S$ defining the named axial distance have a certain extension (which is formed in particular by the bars of the flexural pivot) transverse to their pivot axes, the pivot axes can be formed very close to each other because of the arrangement of the respective pivots, chosen to be offset with respect to each other in the transverse direction Y.

For this, the upper load pivot $G_L$ of the second coupling element K in FIG. 6, which engages on the second end region $H_2$ of the lever H, protrudes through an opening into the lever H until the pivot axis $A_{GL}$ of the upper load pivot passes through the upper lever H. This also results in a reduced installation height in particular in the vertical direction Z.

As mentioned, FIG. 5 shows one of the supporting pivots $G_S$ provided at the first end region $H_1$ of the lever H. FIG. 6 shows the second supporting pivot $G_S$ (far right in FIG. 6) lying opposite this pivot in the transverse direction Y. There too, a slot T is provided, which extends with a wall section at least on one side of the supporting pivot. A supporting section V projects outwards from this wall section in the transverse direction Y, in order to be able to receive the upwards-projecting bars of the supporting pivot $G_S$.

Figure 7:
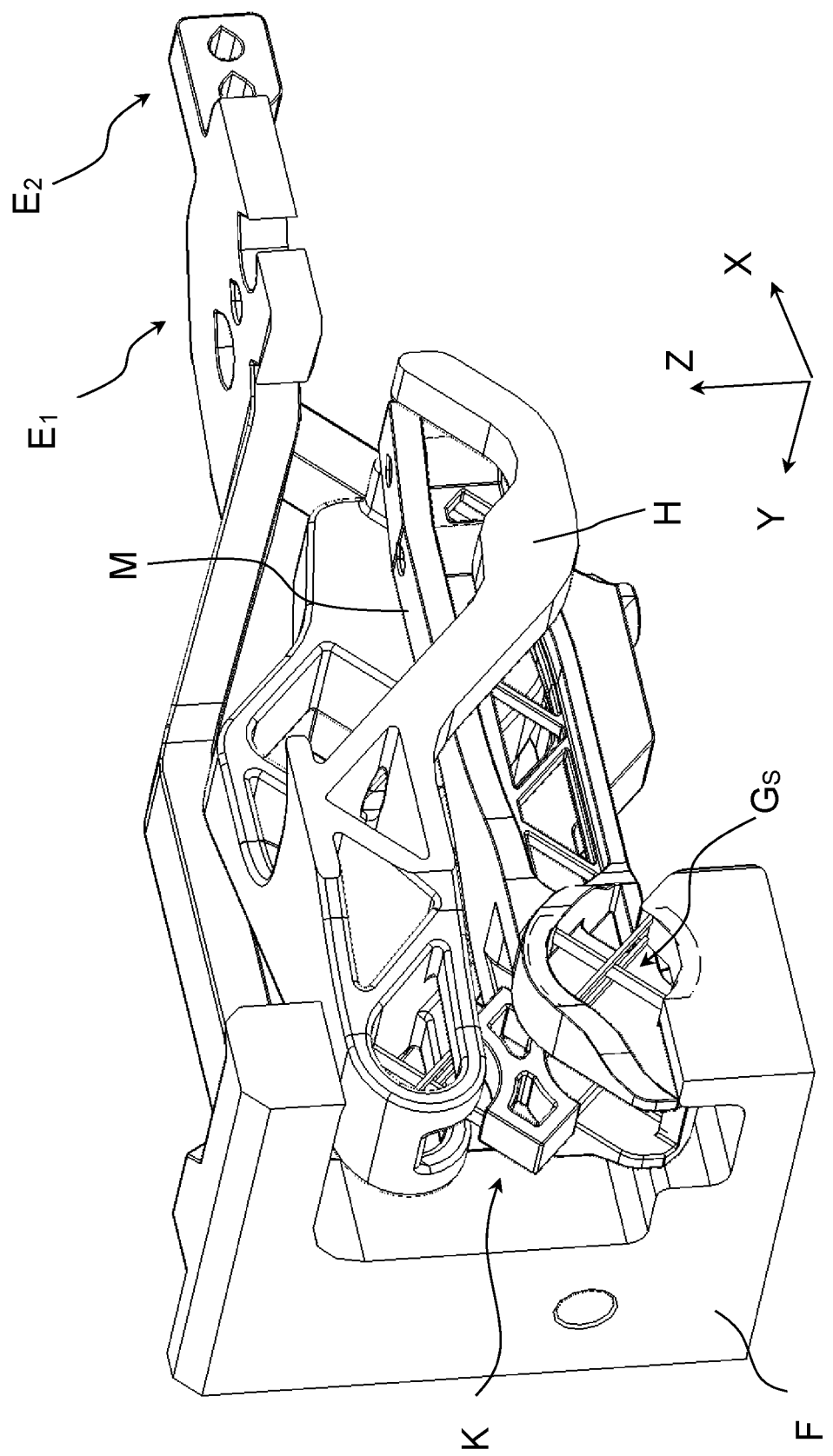
FIG. 7 is a partially cut away isometric view of a part of the fixed base with the levers of FIG. 6 protruding into it.

FIG. 7 shows the arrangement according to FIG. 6, embedded in the fixed base F. Here it can be seen how, in the region of their coupling by means of coupling element K, the two levers M, H protrude into an opening of the fixed base F in order to be able to form maximum lever lengths. Furthermore, it can be seen how the front supporting pivot $G_S$ of the lower lever M is braced on the fixed base F. At its rear end, in the X direction, the fixed base has a mounting section $E_1$, in order to arrange a component of the force compensation system thereon, in particular a permanent magnet D. Yet another section $E_2$, which is provided for receiving the element $Q_2$ of the position detector Q, is attached in the X direction.

Figure 8:
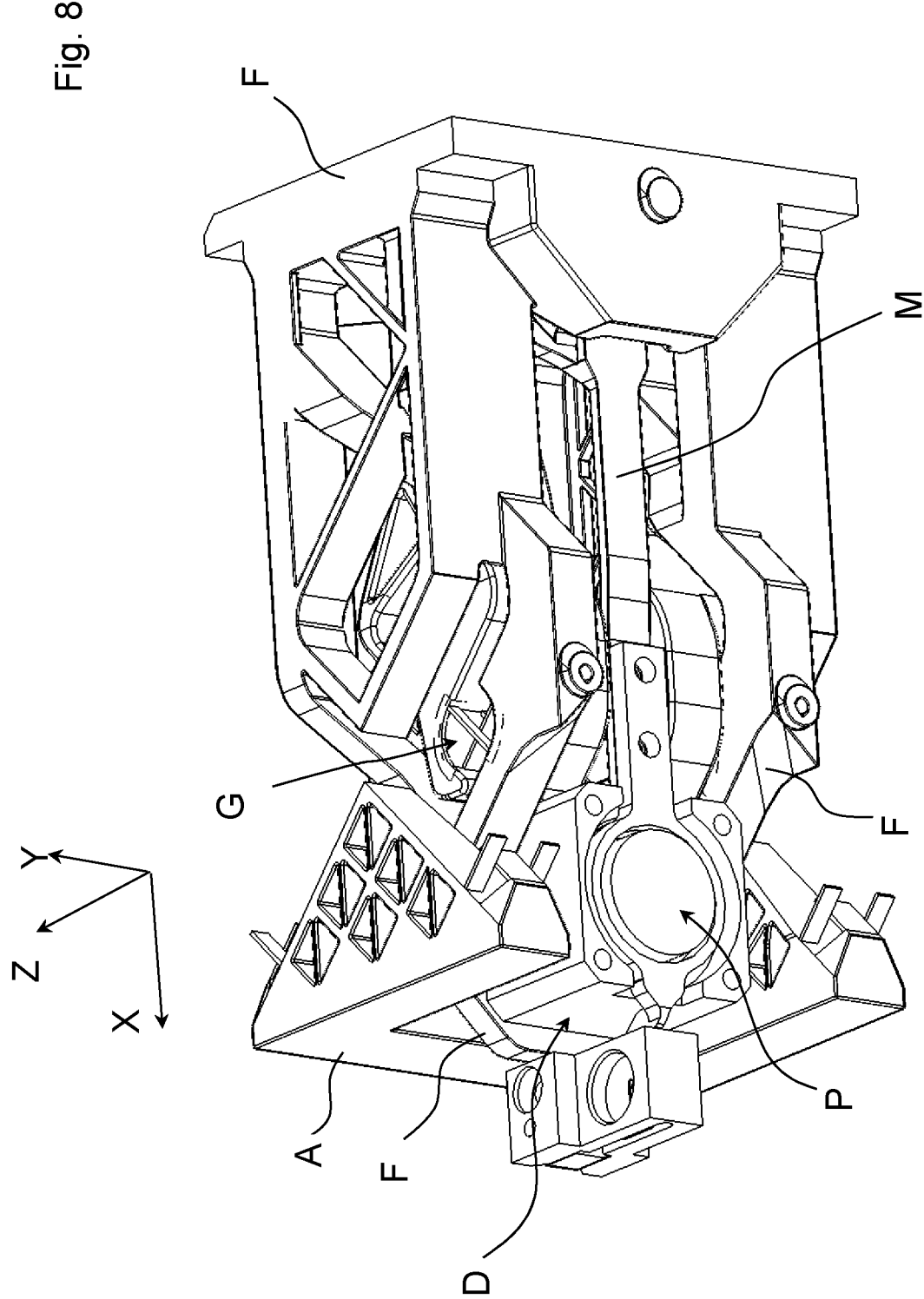
FIG. 8 is a partially cut away isometric view showing the fixed base, levers, and a portion of the load receiver of the embodiment of FIGS. 1-9.

FIG. 8 shows the design according to FIG. 9 in a tilted view, but without the upper and lower control arms $L_o$, $L_u$. What can be seen is a coil P, carried by the lower lever M via an extension screwed onto it, which moves relative to a permanent magnet D, carried by the fixed base F, as a function of the weight force received by the load receiver A and transmitted using the levers. Coil P and permanent magnet D form elements of an electromagnetic force compensation system, with which the pivoting movement of the lever M is compensated, in order to be able to draw conclusions on the weight force to be measured from the coil current necessary therefor.

The coil P and the permanent magnet D are arranged, in the longitudinal direction X, inside an opening provided in the load receiver A, in order to be able to form maximum lever lengths and transmissions in as short as possible an installation space in the longitudinal direction X.

The individual components of the weighing block according to the invention can advantageously penetrate each other in order thereby to reduce installation space. The penetration can be effected in the simplest case in that a first component has an opening into which the other component protrudes. However, the components can particularly preferably also interpenetrate each other, which is to be explained with reference to FIG. 10. There, two components 1, 2, which extend in the longitudinal direction X, can be seen in a cross section formed transverse to the longitudinal direction X. In this section, component 1 has individual partial areas $T_1$, while the cross section of component 2 is made up of the respective partial areas $T_2$. The cross section of component 1 is framed by an envelope $V_1$, and the envelope $V_2$ frames the cross section of component 2. The interpenetration of the two components is characterized in that in each case partial areas of one component are located inside the envelope of the other component. A stable and particularly space-saving arrangement of the components thereby becomes possible. Of course, more than two different components can also penetrate each other in this way.

FIG. 10 also illustrates that the cross-sectional area made up of the individual partial areas of a component is much smaller than the area framed by the respective envelope of this cross section. A lever formed, for example, as a framework structure could have the cross section of component 1, wherein the individual partial areas $T_1$ correspond to the sections through the members with varying dimensions. Component 2 could be a further framework-structure lever coupled to the lever, wherein both levers can penetrate each other in the manner shown by way of example in FIG. 10. FIG. 10 is to illustrate only the penetration principle of components arranged in each other, the cross sections and partial areas of which can also turn out to be different depending on requirements.

Figure 11:
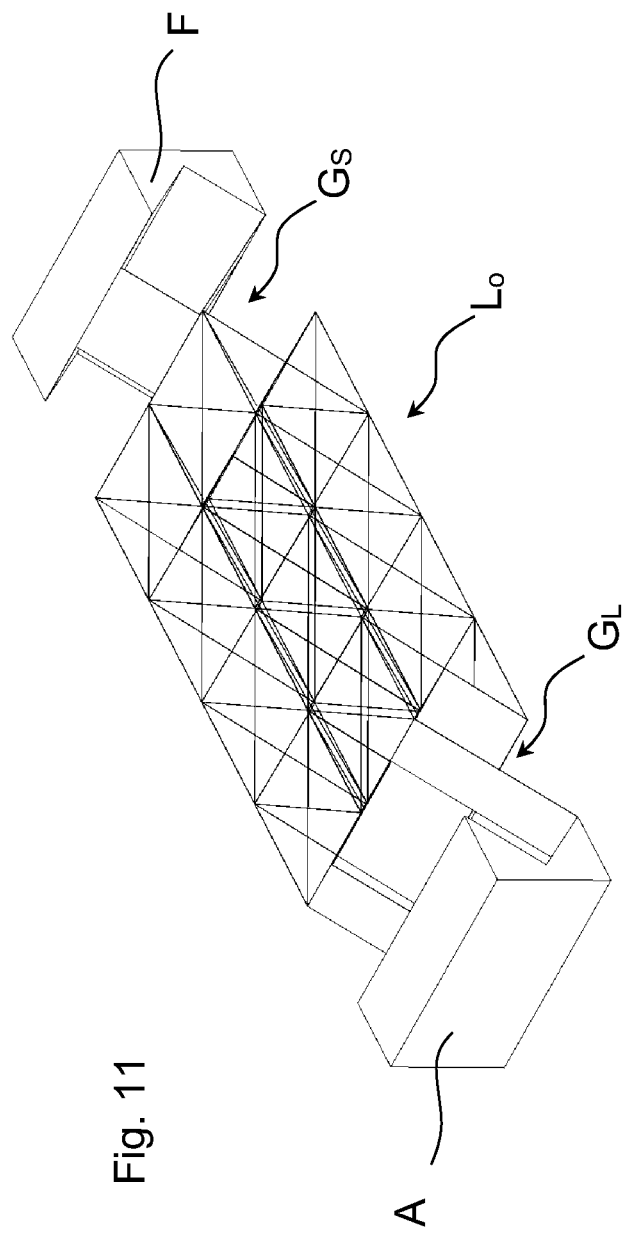
FIG. 11 an example of a framework design of a control arm.

FIG. 11 shows an example of a control arm $L_o$ formed as a framework structure, which is connected in an articulated manner to the fixed base F via a supporting pivot $G_S$ and to the load receiver L via a control arm pivot $G_R$. The framework structure provides high stiffness in all spatial directions with low weight. At the same time, the material-free space between the members provides space for further components, which could penetrate the control arm. In addition or alternatively, one or more other components of the weighing block can of course also be formed framework-like according to this model.

Figure 13:
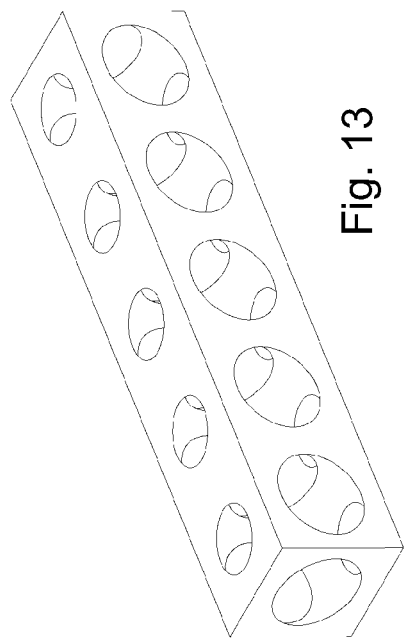
FIG. 13 shows a representation of a second design example for a section of a weighing block component.
Figure 12:
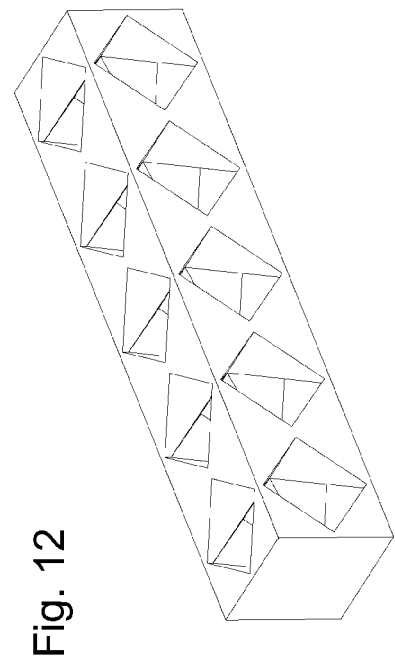
FIG. 12 shows a representation of a first design example for a section of a weighing block component.

FIG. 12 shows an example of a lattice-like structure of a component, which is constructed from individual prisms or has prism-shaped openings passing through it. An alternative design can be seen in FIG. 13, in which a cuboid block has spherical openings passing through it. Of course, these and other designs can if necessary be combined as desired (also within a component).

Figure 14:
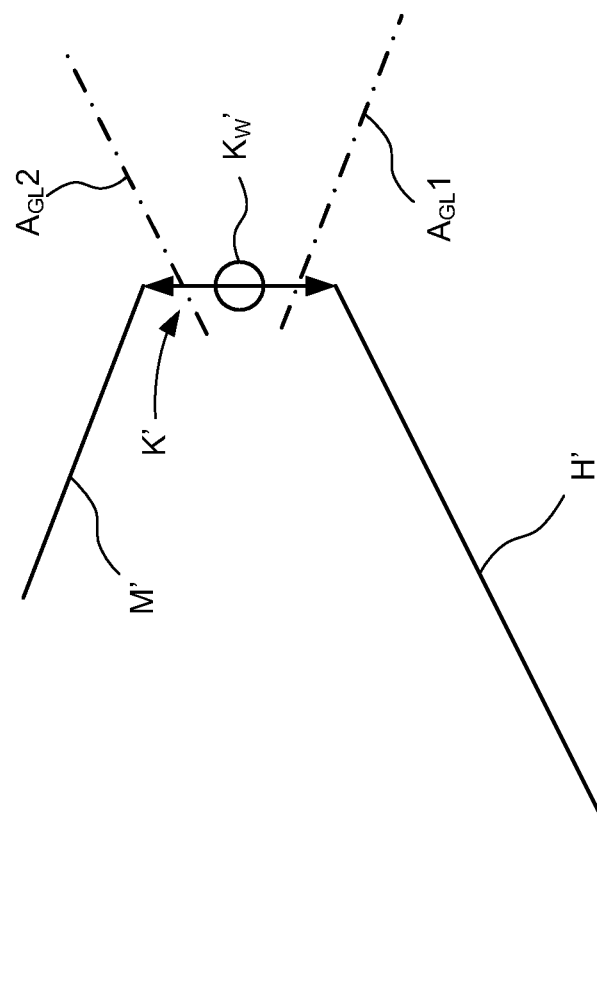
FIG. 14 is a schematic representation of an alternate lever arrangement in accordance with an embodiment of the invention.

The embodiment illustrated in FIGS. 1-9 includes an arrangement of components coupled together so that all pivot axes run parallel to each other. FIG. 14 shows a schematic representation of an arrangement of levers coupled together so as to include pivot axes that run non-parallel. It will be appreciated that other elements of a weighing block such as a fixed base, control arms, and a load receiver are omitted from the simplified schematic view of FIG. 14. The arrangement includes two levers H' and M' where lever H' extends in the X direction shown in the figure and lever M' extends in the Y direction. A coupling element K' (indicated by the double-headed arrow) between levers H' and M' includes a material web $K_W'$ and forms two pivot structures (the pivot structures themselves are not shown in FIG. 14) defining pivot axes $A_{GL}1$ and $A_{GL}2$. Although not shown in FIG. 14, the pivot structures may comprise crossed material bar pivots including two or more material bars as described above (such as supporting pivots $G_S$ in FIG. 5 for example). In the example of FIG. 14, pivot axes $A_{GL}1$ and $A_{GL}2$ extend orthogonally to each other, with pivot axis $A_{GL}1$ extending in the Y direction and pivot axis $A_{GL}2$ extending in the X direction. This arrangement is in contrast to that shown for example in FIG. 6 where coupling element K between levers H and M is associated with two pivot axes $A_{GL}$ that run parallel to each other, both in the Y direction in that view.

As used herein, whether in the above description or the following claims, the terms "comprising," "including," "carrying," "having," "containing," "involving," and the like are to be understood to be open-ended, that is, to mean including but not limited to. Also, it should be understood that the terms "about," "substantially," and like terms used herein when referring to a dimension or characteristic of a component indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

In the above descriptions and the following claims, terms such as top, bottom, upper, lower, vertical, and the like with reference to a given feature are made with reference to the orientation of the structures shown in the drawings and are not intended to exclude other orientations of the structures.

The term "each" may be used in the following claims for convenience in describing characteristics or features of multiple elements, and any such use of the term "each" is in the inclusive sense unless specifically stated otherwise. For example, if a claim defines two or more elements as "each" having a characteristic or feature, the use of the term "each" is not intended to exclude from the claim scope a situation having a third one of the elements which does not have the defined characteristic or feature.

The above described preferred embodiments are intended to illustrate the principles of the invention, but not to limit the scope of the invention. Various other embodiments and modifications to these preferred embodiments may be made by those skilled in the art without departing from the scope of the present invention. For example, in some instances, one or more features disclosed in connection with one embodiment can be used alone or in combination with one or more features of one or more other embodiments. More generally, the various features described herein may be used in any working combination.

LIST OF REFERENCE NUMBERS

α angle of the bar in the flexural pivot
β angle between two pivot axes displaced as far as the cut
1, 2 components of the weighing block (general)

A load receiver
$A_{GL}$ pivot axis of a load pivot
$A_{GR}$ pivot axis of a control arm pivot
$A_{GS}$ pivot axis of a supporting pivot
B weighing block
$B_1$, $B_2$ first/second block end
C opening
D permanent magnet
$E_1$, $E_2$ mounting sections on the fixed base
F fixed base
$G_L$ load pivot
$G_R$ control arm pivot
$G_S$ supporting pivot
H first lever
$H_1$, $H_2$ first/second end region of the lever H
K coupling element
$K_W$ web of coupling element
L load receiver
$L_o$ upper control arm
$L_u$ lower control arm
M second lever
$M_1$, $M_2$ first/second end region of the lever M
P coil
Q position detector
$Q_1$, $Q_2$ elements of the position detector
T slot
$T_1$, $T_2$ partial areas
V supporting section
$V_1$, $V_2$ envelopes
X/Y/Z longitudinal direction/transverse direction/vertical direction

The invention claimed is:

1. A weighing block which extends in a longitudinal direction, in a transverse direction orthogonal to the longitudinal direction, and in a vertical direction orthogonal to the longitudinal direction and transverse direction, the weighing block comprising:
   (a) a fixed base extending in the longitudinal direction from a first block end to a second block end;
   (b) a first control arm and a second control arm, the first control arm extending in the longitudinal direction from a first control arm first end region to a first control arm second end region and being connected to the fixed base via a first control arm supporting pivot, the second control arm extending in the longitudinal direction from a second control arm first end region to a second control arm second end region and being connected to the fixed base via a second control arm supporting pivot;
   (c) a load receiver connected to the first control arm via a first control arm pivot and connected to the second control arm via a second control arm pivot, the load receiver for receiving a weight force introduced along the vertical direction so as to be guided by the first control arm and second control arm relative to the fixed base in a direction parallel to the vertical direction;
   (d) wherein the fixed base, the first control arm, the first control arm supporting pivot, the first control arm pivot, the second control arm, the second control arm supporting pivot, the second control arm pivot, and the load receiver are built up layer by layer by one or more additive manufacturing techniques;
   (e) wherein each of the fixed base, the load receiver, a lever connected between the fixed base and the load receiver, a coupling element associated with the lever, the first control arm, the second control arm, a load pivot associated with the lever, and each other pivot of the weighing block represents a respective component of the weighing block;
   (f) wherein in a section transverse to the longitudinal direction, each component of the weighing block forms a respective cross section that defines a respective envelope of the section, each of at least two of the envelopes of the section encompassing several separate partial areas of the respective component; and
   (g) wherein the at least two of the envelopes of the section at least partially overlap and at least one partial area of one of the at least two of the envelopes of the section lies inside the envelope of the other one of the at least two of the envelopes of the section.

2. The weighing block of claim 1 wherein the lever connected between the fixed base and the load receiver includes a first lever extending between a first lever first end region and a first lever second end region, the first lever in the first lever first end region being attached to a first coupling element comprising a first coupling element load pivot for transmitting a force, the first lever also being connected to the fixed base via a first lever supporting pivot, the first lever supporting pivot forming a first lever supporting pivot axis and the first coupling element load pivot forming a first coupling element load pivot axis.

3. The weighing block of claim 2 wherein the first coupling element load pivot comprises a respective flexural pivot in which at least two material bars are arranged with respect to each other such that in a projection along the first coupling element load pivot axis one of the material bars forms an angle α with another one of the material bars, where $45° \leq \alpha \leq 135°$.

4. The weighing block of claim 3 wherein an additional first lever supporting pivot is connected to the first lever in the first lever first end region and has an additional first lever supporting pivot axis, the additional first lever supporting pivot comprising a respective flexural pivot in which at least two material bars are arranged with respect to each other such that in a projection along the additional first lever supporting pivot axis one of the material bars forms an angle α with another one of the material bars, where $45° \leq \alpha \leq 135°$.

5. The weighing block of claim 3 wherein two material bars of the at least two material bars intersect in the projection along the first coupling element load pivot axis.

6. The weighing block of claim 1 wherein the lever connected between the fixed base and the load receiver includes a first lever extending between a first lever first end region and a first lever second end region, the first lever in the first lever first end region being attached to a first coupling element, the first lever also being connected to the fixed base via a first lever supporting pivot, and wherein the first coupling element has two flexural pivots spaced apart from each other and connected to each other by a material web.

7. The weighing block of claim 1 wherein the first control arm supporting pivot, the first control arm pivot, the second control arm supporting pivot, and the second control arm pivot each lie at a respective corner of a parallelogram.

8. The weighing block of claim 1 further including a lever pivot connected to the lever, the lever pivot beings bordered, in relation to the direction of a pivot axis of the lever pivot, on one or both sides by a material section of the lever.

9. The weighing block of claim 1 wherein the lever at a respective end thereof is engaged with at least two pivots, each pivot forming a respective pivot axis extending parallel to a pivot axis direction and offset from each other, and wherein the at least two pivots engaged with the lever lie one behind the other in the pivot axis direction such that one of the pivots overlaps with another one of the pivots when viewed in the pivot axis direction.

10. The weighing block of claim 1 wherein the lever at a respective end thereof is engaged with two pivots each pivot forming a respective pivot axis extending parallel to a pivot axis direction and offset from each other such that a spacing between the two pivots in one of the longitudinal direction, transverse direction, and vertical direction is greater than zero and is smaller than the dimension of at least one of the pivots in the one of the longitudinal direction, transverse direction, and vertical direction.

11. The weighing block of claim 1 wherein the lever has a slot for receiving a first pivot.

12. The weighing block of claim 11 wherein the slot has a wall section from which a first supporting section projects in a first side direction for connection to the first pivot, and wherein a further supporting section projects from the wall section in a second side direction opposite to the first side direction for connection to a further pivot.

13. The weighing block of claim 12 characterized in that the first supporting section and the further supporting section form a Z-shaped cross section with the wall in a plane extending transverse to a plane of the wall.

14. The weighing block of claim 1:
(a) wherein the lever connected between the fixed base and the load receiver includes a first lever extending between a first lever first end region and a first lever second end region; and
(b) further including a second lever extending between a second lever first end region and a second lever second end region, the second lever being connected at the second lever first end region to the first lever second end region via a coupling element having a coupling element load pivot and being connected at the second lever second end region to the fixed base via a second lever supporting pivot.

15. The weighing block of claim 14 wherein one of the first lever and second lever has an opening in which a section of the other one of the first lever and second lever is positioned.

16. The weighing block of claim 1 wherein:
(a) the first control arm and the second control arm extend parallel to each other; and
(b) the fixed base extends in the longitudinal direction from the first block end (i) between the first control arm and the second control arm, or (ii) through the load receiver, or (iii) both through the load receiver and between the first control arm and the second control arm.

17. The weighing block of claim 1 wherein the load receiver or the fixed base or both the load receiver and the fixed base is penetrated by a respective opening running in the longitudinal direction, in which opening at least one supporting pivot is positioned.

18. The weighing block of claim 1 wherein the lever is bordered on both sides in the transverse direction by a further lever, the further lever being bordered on both sides in the transverse direction by the fixed base.

19. The weighing block of claim 1:
(a) wherein the lever is engaged with a load pivot;
(b) wherein at least one of the load pivot, the first control arm supporting pivot, the second control arm supporting pivot, the first control arm pivot, and the second control arm pivot comprises a respective flexural pivot including at least three material bars; and
(c) wherein, in a projection along a pivot axis of the respective flexural pivot, a first one of the at least three material bars forms an angle (a) with a second and third one of the at least three material bars, where $45° \leq \alpha \leq 135°$.

20. The weighing block of claim 19 wherein in the projection along the pivot axis of the respective flexural pivot, a first one of the at least three material bars intersects with a second and third one of the at least three material bars.

21. The weighing block of claim 1:
(a) wherein the lever is engaged with a load pivot;
(b) further including a coupling element engaged with the lever; and
(c) wherein at least one part of the lever, or at least one part of one of the first control arm and second control arm, or at least part of the fixed base, or at least part of the load receiver or at least part of the coupling element comprises a framework structure.

22. The weighing block of claim 1:
(a) wherein the lever extends along a lever longitudinal axis, the lever at each point along the length thereof along the lever longitudinal axis defining a lever cross section envelope perpendicular to the lever longitudinal axis; and
(b) wherein for each respective point along at least 50% of the length of the lever along the lever longitudinal axis, the lever cross section envelope at that respective point includes two or more separate partial areas of the lever and the sum of the two or more separate partial areas of the lever is less than the area of the lever cross section envelope.

23. The weighing block of claim 1:
(a) wherein the lever is engaged with a load pivot, wherein the load pivot and each other pivot included in the weighing block extends along a respective pivot axis; and
(b) wherein the respective pivot axis of one of the pivots extends non-parallel to the respective pivot axis of a different one of the pivots.

24. The weighing block of claim 1 wherein the weighing block is formed partly or completely of metal.

25. A process for producing the weighing block of claim 1 wherein the fixed base, the load receiver, the control arms, and pivots are formed by repeatedly depositing thin material layers.

26. The process of claim 25 wherein the thickness dimension of each material layer extends in the longitudinal direction with a first deposited layer located at the first block end.

27. The process of claim 25 wherein a material buildup of a first component of the weighing block is interrupted by a material buildup of a second component of the weighing block, the first component comprising the fixed base, or the load receiver, or one the control arms, or one of the pivots and the second component comprising a component of the weighing block other than the first component.

* * * * *

UNITED STATES PATENT AND TRADEMARK OFFICE
CERTIFICATE OF CORRECTION

| | |
|---|---|
| PATENT NO. | : 11,808,618 B2 |
| APPLICATION NO. | : 16/875235 |
| DATED | : November 7, 2023 |
| INVENTOR(S) | : Jan Gottfriedsen et al. |

It is certified that error appears in the above-identified patent and that said Letters Patent is hereby corrected as shown below:

In the Claims

In Claim 8, at Column 18, Line 60, change "the lever pivot beings bordered" to read --the lever pivot being bordered--

Signed and Sealed this
Twelfth Day of December, 2023

*Katherine Kelly Vidal*

Katherine Kelly Vidal
*Director of the United States Patent and Trademark Office*